June 7, 1960
W. HERTERICH
2,940,046
DEVICES FOR TEMPORARILY HOLDING THE POINTER OF AN INSTRUMENT IN AN INDICATION POSITION
Filed Nov. 7, 1956
2 Sheets-Sheet 1
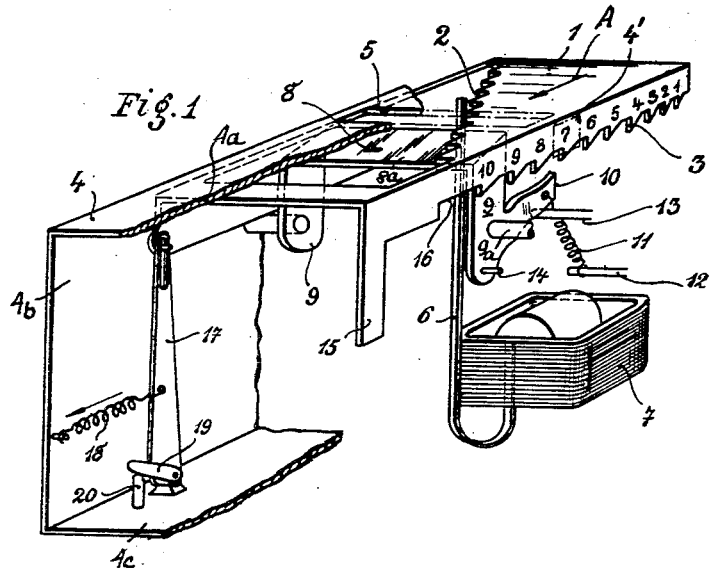
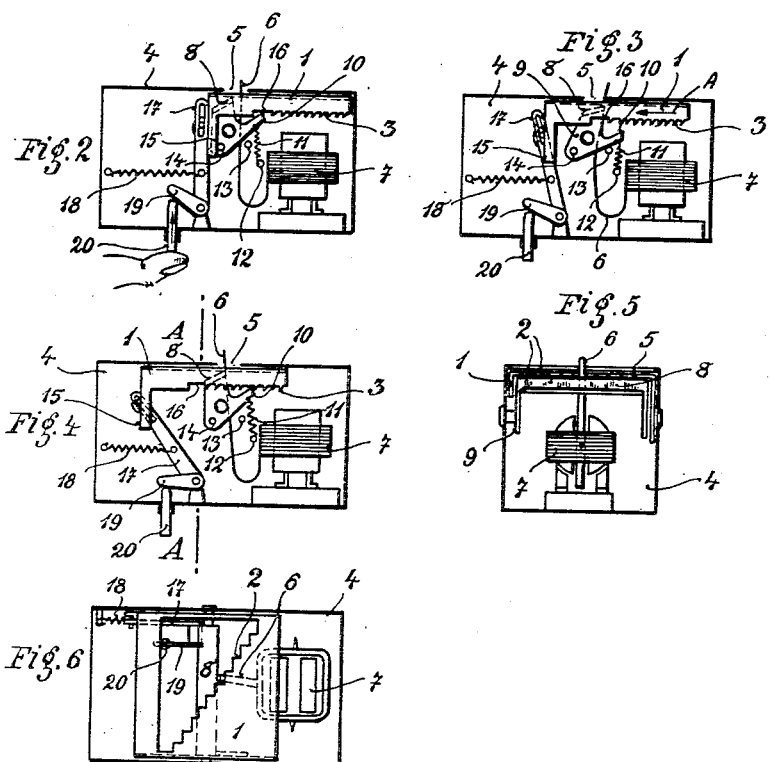
INVENTOR.
WALTER HERTERICH
BY

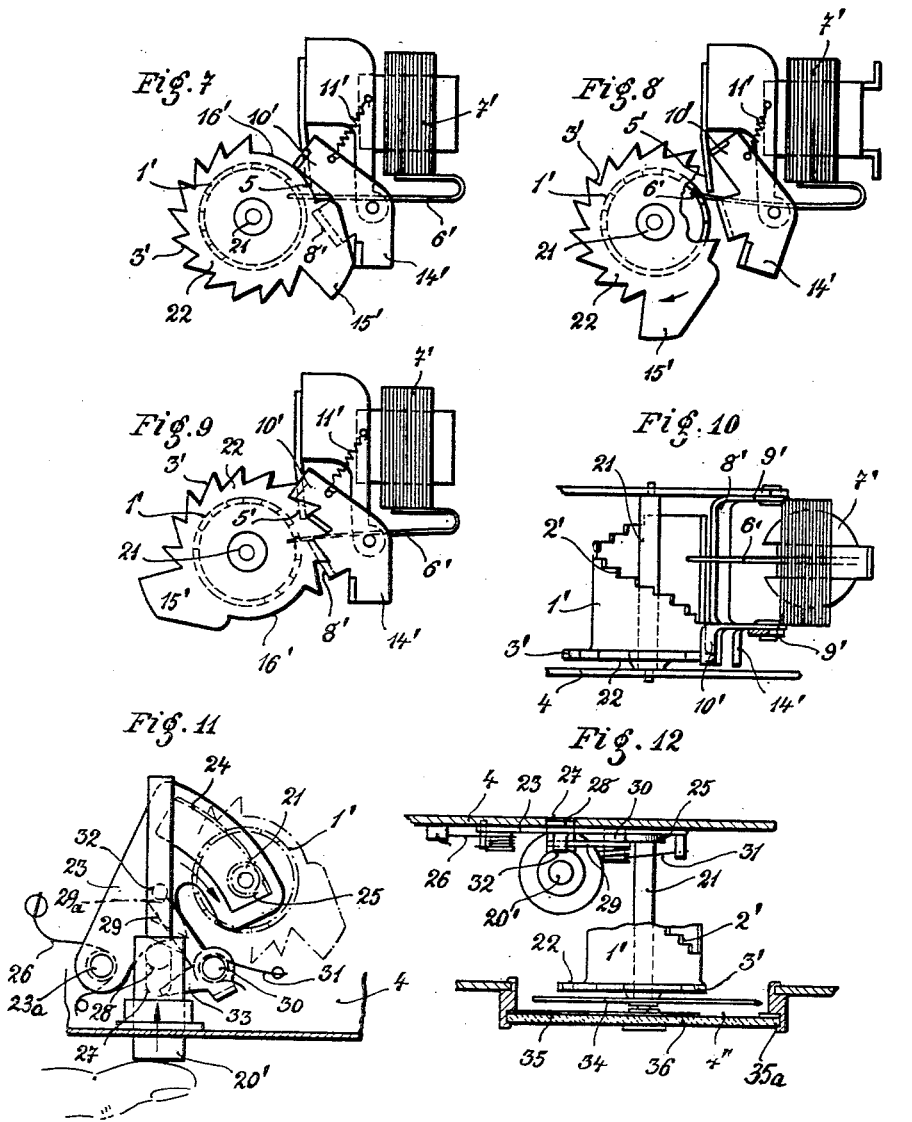

United States Patent Office 2,940,046
Patented June 7, 1960

2,940,046

DEVICES FOR TEMPORARILY HOLDING THE POINTER OF AN INSTRUMENT IN AN INDICATION POSITION

Walter Herterich, Ludwig von Herterich, Weg. 7, Dachau, Germany

Filed Nov. 7, 1956, Ser. No. 620,923

Claims priority, application Germany Nov. 12, 1955

11 Claims. (Cl. 324—155)

This invention relates to a device for temporary holding or fixing the deflected position of the needle or indicator of a rotary coil system employable in exposure meters and like instruments.

Devices for retaining the needle or pointer of a rotary coil system in the respective position of deflection were heretofore used in light or exposure meters for cameras, where the pointer serves as an abutment for a control element which is provided with teeth, and is spring-loaded and to which tension may be applied from outside the instrument.

Such instrument is equipped next to the toothed control device for the pointer, with a second toothed mechanism or gearing which through the abutment of the control device with the pointer engages a stationary stop, so that the control device or element relieves the pointer and simultaneously frees the latter.

Such known devices have first of all the purpose to protect the pointer and also its rotary coil system against undesirable load and to construct locking means for the control device independently of the highly sensitive rotary coil system.

It is an object of the present invention to provide means avoiding any cause for accidental positionings of the pointer during operation of the light meter.

It is possible that the pointer during its free play may be so adjusted that one tooth of the toothed gearing comes to lie exactly on the edge of the pointer so that the latter will have the tendency to slide off the control tooth, and is pressed sidewardly thereof, so that the pointer jumps under certain circumstances beyond the rearwardly positioned teeth.

It is to be stressed that the teeth of the control element despite the fact that they are very carefully worked, do no possess any sharp cutting but only rounded edges, sufficient to favor such sliding of the pointer. The spring action of the latter further imparts sufficient inertia which causes the sliding off of the pointer over the backwardly arranged teeth. Such an edge contact may only seldom occur, these possibilities, however, have to be considered and eliminated, if the instrument is constantly in use. It is further to be observed that the instrument during careless handling and manipulation is subjected to jerks which cause the pointer which is highly sensitive and springy, to reach the aforementioned accidental positions.

These and other objects of the invention will become further apparent from the following detailed description, reference being made to the accompanying drawings, showing preferred embodiments of the invention.

In the drawings:

Fig. 1 is a perspective view on a somewhat enlarged scale of a light meter embodying the invention, parts being broken off.

Figs. 2 to 4 inclusive show on a reduced scale various positions of the pointer of the light meter of Fig. 1 to which reference is made in the specification.

Fig. 5 is a cross sectional view taken along lines A—A of Fig. 4.

Fig. 6 is a top plan view of the instrument of Fig. 1 with the top plate thereof removed.

Figs. 7 to 9 inclusive illustrate schematically a modified form of the invention, the control mechanism being shown in various positions.

Fig. 10 is a top plan view of the embodiment shown in Fig. 7.

Fig. 11 shows schematically a further modified form of the invention.

Fig. 12 is a top plan view of the embodiment shown in Fig. 11, parts being broken off.

Referring now are particularly to Fig. 1 as well as to Figs. 2 to 4 inclusive, there is disclosed a checking member or control element 1 which is, in this particular instance, U-shaped in cross section, so that on a relatively wide and horizontal strap the control gearing 2 and on the respective leg or shank a locking gearing 3 are provided. The control element 1 is guided by means of its legs in a case-like, U-shaped housing 4 and more especially below the upper wall 4a of said housing, which wall 4a is provided with a transverse slot 5 in which the indicator or pointer 6 of a rotary coil system 7 operates. Within the U-shaped control organ 1 there is arranged as a stop or abutment a bail-shaped member 8 which is rotatable with its legs 9 relative to the side walls 4b of the housing 4 about an axis 9a. The movements of the transverse strap or crosspiece 8a below said transverse slot 5 beyond the width of the latter are controlled. From one leg 9 of the U-shaped bail member 8 an arm 10 branches off, on which a tension spring 11 is anchored, which is affixed to the respective side wall at 12 and thus presses bail member 8 against an abutment 13 also provided on the respective side wall 4b as shown in Figs. 1 and 2. Leg 9 carrying arm 10 extends beyond the point of rotation 9a and is equipped with an abutment 14 in whose path projection 15 is disposed which is connected to the respective leg of the control element 1 carrying the locking gearing 3.

The control or locking gearing 3 terminates in a notch 16 without teeth which extends ahead of projection 15.

The control element 1 may be tensioned by means of a double lever or bell crank 17, the spring 18 of which possesses a greater force than that of spring 11. The shorter arm 19 of the bell crank 17 which may be journalled on the bottom 4c of the housing 4 is forced due to the action of spring 18 against a push button 20 projecting beyond the bottom and actuable from without the housing 4 as it is conventional.

The operation of the light exposure meter or instrument with its built-in control mechanism is as follows:

Fig. 2 shows the starting position of the control mechanism into which position the control or checking element 1 with its control gearing 2 is brought by means of the aforesaid push button 20 by the finger of an operator's hand, before the instrument is used. Control element 1 is thus completely retracted and is tensioned by means of spring 18 attached to lever 17. In this position extension 15 is in contact with and lies against abutment 14 on the one leg of the bail-shaped member 8 and lifts the latter off pointer 6. Arm 10 engages thereby notch or recess 16, does not abut against stop 13 and simultaneously spring 11 is under tension. Pointer 6 may, therefore, play freely within transverse slot 5 and adjusts itself according to the light value pertaining to the object to be photographed.

After pointer 6 has come to rest the push-button 20 is released and as a consequence thereof control element 1 will be moved through lever 17 in forward direction as indicated in Figs. 1 and 3 by arrow A. At the start of this control movement extension 15 is liberated from stop 14 of bail member 8 and releases the latter so that said bail member 8 contacts under relatively weak pressure due to the influence of spring 11 said pointer 6 and thus exerts a braking effect on the latter.

Depending on the strength of the spring force of the pointer 6 this braking effect may suffice to hold or retain pointer 6 in its position. Ordinarily, however, the latter will be somewhat flexed through the action of bail-shaped member 8 until pointer 6 lies against an edge of transverse slot 5, so that the aforesaid braking effect will be enhanced, as more clearly apparent from Fig. 3.

Upon further movement of the control or position determining element 1, one of the teeth of the gear rack 2 comes into contact with the indicator or pointer 6. Should this tooth abut exactly against an edge of the pointer, the braking action exerted on the latter by the bail member 8 prevents further movement of the pointer. The check or control element 1 is then able, without any danger of the pointer sliding relative to the same, to swing and bend the pointer in the opposite direction, whereby the bail member 8 is simultaneously pivoted about its axis 9a so as to bring its arm 10 into engagement with one of the teeth of the locking gear rack 3 provided on the respective side or leg of the control element 1.

The latter is thus locked in position and the pointer returned to its undeformed or straight condition. This position is shown in Fig. 4 and as a consequence thereof the pointer is held in its attained position until the next use of the instrument.

Upon locking of the control element 1 in its position it is possible to determine the quantity of light or light value emanating from the object, and this may be evaluated in a number of different ways known per se.

As will be seen from Fig. 1, the leg of the U-shaped control element 1 carrying the locking gear rack 3 may be provided with a plurality of numbers, by way of Examples 1 to 10, representing various light values, each number corresponding to one of the teeth of the locking gear rack and being discernible through a window 4' provided in the housing 4. Such a window is indicated in Fig. 1 by broken lines opposite the number "7," and the window may, of course, be arranged for controlled displacement depending on the sensitivity of the film employed.

Whereas in the embodiment of the invention illustrated in Figs. 1 to 6 the control element 1 moves only rectilinearly, it is possible to apply the principles of the present invention to a control or checking element having rotary motion. Such an embodiment of the invention is illustrated in Figs. 7 to 12.

As may be seen from Fig. 10, the control element comprises a hollow checking cylinder 1' which is fixedly mounted on a shaft 21, the control gearing 2' being milled into the cylinder wall along a helical or screw thread-like line. The control cylinder 1' is so arranged in front of the rotary coil system 7' that the pointer 6' can move within said cylinder. A bail member 8' is journaled with its legs 9' in the housing 4 (only partially shown) laterally of the control cylinder 1' and extends across the path of movement of the pointer 6'.

The bail member 8' which is subjected to the force of a spring 11' is provided on its leg facing the locking wheel or rotary member 22 with two arms 10' and 14', the arm 10' serving as a locking member and thus lying in the path of the locking gearing 3', the other arm 14' being adapted to engage an abutment 15' on the wheel or rotary member 22. The later is fixedly connected with the hollow cylinder 1' which in turn is biased by means of a spring (not shown) which, for example, may be seated on the shaft 21.

The operation of this embodiment of the invention is as follows:

In Fig. 7 is illustrated the initial or starting position of the instrument, in which position the pointer 6' may adjust itself freely between an abutment or projection 5' and the bail member 8' in accordance with the sensed light value.

The bail member 8' is lifted from the pointer by means of the arm 14' engaging the abutment 15' of the wheel 22, and at the same time the opposite arm 10' rests in the smooth portion 16' (devoid of any teeth) of the periphery of the wheel 21.

If the prebiased hollow cylinder or checking element 1' is now released, it will rotate in clockwise direction and assume the position illustrated in Fig. 8, in which the now released bail member 8' is lightly pressed by means of its spring 11' against the pointer 6', whereby the latter is slightly abutting against the edge of the projection or abutment 5', as a result of which the pointer is retained against any further change of position. Upon further rotation of the control or checking element cylinder 1' one of the teeth of its control gearing 2' comes into engagement with the pointer 6' and deflects the same in a direction opposite to that caused by the bail member 8', whereby the arm 10' of said bail member is displaced against the appropriate tooth of the control gearing 3', thus locking the hollow cylinder 1' in position. This position is apparent from Fig. 9.

To this extent the motions and thus the operation of the instrument are substantially the same as in the embodiment of Figs. 1 to 7.

With respect to the hollow cylinder 1', the same may be actuated in a number of ways, one of which is represented in Figs. 11 and 12. As may be seen from these figures, the driving or operating element consists of a toothed or gear segment 23 the teeth 24 of which mesh with a pinion 25 mounted on the shaft 21 of the hollow cylinder 1'.

In operation, upon application of finger pressure to the push button 20' the gear segment 23 is swung about its axis 23a, whereby the hollow cylinder 1' is rotated to a predetermined extent through the intermediary of the gearing 24, 25, the segment 23 being at the same time subjected to the return biasing force of a torsion spring 26. This position is indicated in Fig. 11. Limiting of the motion of the push button 20' and thus of the segment 23 is effected by means of a transverse pin 28 extending from the push button and riding in a slot 27 provided in the adjacent wall of the housing 4.

The remaining braking and locking actions relating to the pointer 6' and described with respect to Figs. 7 to 10 take place during depression of the push button 20' and are completed upon release of this button.

In order to render the controlling motion independent of the movement of the finger, i.e., of the speed with which the push button 20' when it is released by the finger, and in order to subject the cylinder 1' only to the force of the torsion spring 26 there is provided an angle lever or bell crank 29 which is mounted for rotation about a pivot 30 and retained in the position shown in Fig. 11 by means of a torsion spring 31.

In the tensioned position of the gear segment 23 the lever 29 falls with its catch-shaped upper end 29a against an abutment 32 located on the gear segment and restrains the segment in its return or pointer-controlling motion until, shortly before return to its starting position, the transverse bolt or pin 28 of the push button engages the arm 33 of the bell crank and lifts the latter from the abutment 32 so as to release the gear segment 23 for the next operation. The swinging motion of the bell crank 29 is indicated in broken lines in Fig. 11.

As will be readily appreciated from Fig. 12, a time scale-carrying disk 34 is keyed onto the shaft 21, this disk being provided with additional indicia to show not only the exposure time required for any particular shutter setting but also the various light values. The indicia may be seen through a window 4" formed in a plate 35 mounted in an opening 35a of the housing covered in its entirety by a glass disk 36.

As in the embodiment of Figs. 1 to 6, the position of the window 4" may be adjusted in accordance with the film sensitivity.

Thus it will be seen that the invention provides, in an indicating device having a pointer reciprocally movable along a predetermined path between a plurality of indication positions, mechanism for securing said pointer in an attained indication position, comprising first holding means 1 or 1' reciprocally displaceable transversely to said path and provided with a plurality of clamping teeth 2 or 2' spaced along a line oriented obliquely with respect to and intersecting said path, said teeth thereby being arranged for movement substantially transversely to said path and being engageable, respectively, with one side of said pointer, second holding means 8 or 8' extending along said path and engageable with the opposite side of said pointer and arranged for movement substantially transversely to said path, first and second biasing means 18 and 11 or 11' connected to said first and second holding means, respectively, and biasing the same toward one another, whereby said pointer may be clamped in any position which it attains between said second holding means and a respective tooth of said first holding means, and cooperable means 15 and 14 or 15' and 14' on said first and second holding means for moving and retracting the latter from said path against the force of said second biasing means upon displacement and retraction of said first holding means from said path against the force of said first biasing means, whereby said pointer is released for free movement to attain an indication position along said path, subsequent displacement of said first and second holding means toward said path under the forces of said first and second biasing means, respectively, causing clamping of said pointer in said attained indication position.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. In a light-meter having a rotary electric coil and a pointer connected to said coil for reciprocal movement therewith and along a predetermined path between a plurality of indication positions; a mechanism for securing said pointer in an attained indication position, said mechanism comprising a checking element reciprocally displaceable substantially transversely to said path and provided with a plurality of clamping teeth spaced along a line oriented obliquely with respect to and intersecting said path, said teeth thereby being arranged for movement substantially transversely to said path and being engageable, respectively, with one side of said pointer, abutment means engageable with the opposite side of said pointer extending along said path and being arranged for movement transversely to said path, first and second biasing means connected to said checking element and to said abutment means, respectively, and biasing the same in opposite directions and past one another, whereby said pointer may be clamped in any position which it attains between said abutment means and a respective tooth of said checking element, and cooperable means on said checking element and on said abutment means for moving and retracting the latter from said path against the force of said second biasing means upon displacement and retraction of said checking element from said path against the force of said first biasing means, whereby said pointer is released for free movement to attain an indication position, subsequent displacement of said checking element and said abutment means toward said path under the forces of said first and second biasing means, respectively, causing clamping of said pointer in said attained indication position, said abutment means being provided with a projection, said checking element being provided with a plurality of locking teeth, said first biasing means being constructed to exert a force greater than the force exerted by said second biasing means, whereby, upon clamping of said pointer between said abutment means and said respective tooth of said checking element, movement of said abutment means against the force of said second biasing means is effected to bring said projection into engagement with one of said locking teeth and thereby lock said checking element against further displacement under the force of said first biasing means.

2. In a light-meter according to claim 1; said abutment means comprising a bail-shaped member having spaced legs pivotally mounted, said projection extending from one of said legs.

3. In a light-meter according to claim 2; said checking element being substantially U-shaped with lateral legs and a transverse strap portion, said clamping teeth being disposed on said strap portion and along a substantially straight line, and said locking teeth being disposed on that one of said lateral legs of said checking element adjacent said one leg of said bail-shaped member.

4. In a light-meter according to claim 3; a housing, said checking element being horizontally guided within said housing, said housing being provided with a transverse horizontal slot defining said path of movement of said pointer and being further provided with pivot means for mounting said legs of said bail-shaped member.

5. In a light-meter according to claim 1; said abutment means comprising a bail-shaped member having spaced legs pivotally mounted with said projection extending from one of said legs, an arm extending from said one leg of said bail-shaped member, said checking element comprising a hollow cylinder journaled for rotation about an axis extending along said path of movement of said pointer and having said clamping teeth disposed along a helical line extending substantially peripherally of said cylinder, a wheel fixed to and positioned coaxially with said cylinder, said locking teeth being arranged along a part of the periphery of said wheel, a cam occupying a further part of said wheel periphery, the remainder of said wheel periphery being free, said arm and said projection extending into the path of rotation of said wheel with said arm being engageable by said cam, said cam and arm constituting said cooperable means.

6. In a light-meter according to claim 5; means for rotating said hollow cylinder against the force of said first biasing means comprising spring-biased gearing means operatively connected to said shaft, a reciprocally movable pushbutton, and means operatively interconnecting said pushbutton with a portion of said gearing means for operating the latter and thus rotating said cylinder upon displacement of said pushbutton from its rest position.

7. In a light-meter according to claim 6; a spring-biased bell crank lever having spaced arms located in the path of movement of said pushbutton and operable to inhibit operation of said gearing means despite movement of said pushbutton from said rest position until shortly before said pushbutton returns to said rest position.

8. A meter comprising a housing, an electrical coil rotatably mounted in said housing and having a pointer connected to and for movement with said coil, a bail member having two arms and being mounted adjacent said coil for pivotal movement and engageable with said pointer, an abutment connected to said housing and located adjacent the path of movement of said pointer whereby said pointer is retainable between said housing abutment and said bail member, a movable hollow cylinder having two ends, one of said ends having helical control means provided thereon which is engageable with said pointer, the other end of said hollow cylinder having a rotary member with locking gearing on its periphery, said rotary member including an abutment engageable with one of said arms of said bail member, the other arm of said bail member being engageable with said locking gearing, first biasing means normally urging said one arm of said bail member into engagement with said abutment of said rotary member, and second biasing means for rotating said hollow cylinder toward engagement of said helical control means with said pointer and to release said one arm of said bail member from said abutment on said rotary member to permit said locking gearing to lockingly engage said other arm of said bail member with said pointer held between said bail member and said control means.

9. A meter comprising a housing, an electrical coil rotatably mounted in said housing and having a pointer connected to and for movement with said coil, a bail member having two arms and being mounted adjacent said coil for pivotal movement and engageable with said pointer, an abutment connected to said housing and located adjacent the path of movement of said pointer whereby said pointer is retainable between said housing abutment and said bail member, a movable hollow cylinder having two ends, one of said ends having helical control means provided thereon which is engageable with said pointer, the other end of said hollow cylinder having a rotary member with locking gearing on its periphery, said rotary member including an abutment engageable with one of said arms of said bail member, the other arm of said bail member being engageable with said locking gearing, first biasing means normally urging said one arm of said bail member into engagement with said abutment of said rotary member, and second biasing means for rotating said hollow cylinder toward engagement of said helical control means with said pointer and to release said one arm of said bail member from said abutment on said rotary member to permit said locking gearing to lockingly engage said other arm of said bail member with said pointer held between said bail member and said control means, said control means including teeth disposed on a helical line extending along substantially the periphery of said one end of said hollow cylinder.

10. A meter comprising a housing, an electrical coil rotatably mounted on said housing and having a pointer connected to and for movement with said coil, a bail member having two arms and being mounted adjacent said coil for pivotal movement and engageable with said pointer, an abutment connected to said housing and located adjacent the path of movement of said pointer whereby said pointer is retainable between said housing abutment and said bail member, a movable hollow cylinder having two ends, one of said ends having helical control means provided thereon which is engageable with said pointer, the other end of said hollow cylinder having a rotary member with locking gearing on its periphery, said rotary member including an abutment engageable with one of said arms of said bail member, the other arm of said bail member being engageable with said locking gearing, first biasing means normally urging said one arm of said bail member into engagement with said abutment of said rotary member, second biasing means for rotating said hollow cylinder toward engagement of said helical control means with said pointer and to release said one arm of said bail member from said abutment on said rotary member to permit said locking gearing to lockingly engage said other arm of said bail member with said pointer held between said bail member and said control means, said second biasing means comprising spring biased gearing means operatively connected to said hollow cylinder, a reciprocably movable pushbutton, and means operatively interconnecting said pushbutton with said gearing means for operating said gearing means and thus rotating said hollow cylinder upon displacement of said pushbutton.

11. A meter according to claim 8, said control means including teeth disposed on a helical line extending along substantially the periphery of said one end of said hollow cylinder, said second biasing means comprising spring biased gearing means operatively connected to said hollow cylinder, a reciprocally movable pushbutton, and means operatively connecting said pushbutton with said gearing means for operating said gearing means and thus rotating said hollow cylinder upon displacement of said pushbutton.

References Cited in the file of this patent
UNITED STATES PATENTS

| 2,325,463 | Axler | July 27, 1943 |

FOREIGN PATENTS

| 312,522 | Great Britain | May 30, 1929 |
| 495,463 | Germany | Apr. 7, 1930 |
| 905,889 | Germany | Mar. 8, 1954 |